United States Patent [19]
Hsiao et al.

[11] Patent Number: 5,219,802
[45] Date of Patent: Jun. 15, 1993

[54] POROUS CERAMIC RADIATION PLATE

[75] Inventors: Ching-Sung Hsiao; Chen-Wen Tsai, both of Hsinchu, Taiwan

[73] Assignee: Industrial Technology Research Institute, Hsinchu, Taiwan

[21] Appl. No.: 877,820

[22] Filed: May 4, 1992

[51] Int. Cl.$^5$ .............................................. C04B 38/06
[52] U.S. Cl. .................................................. 501/81
[58] Field of Search ................. 501/1, 80, 81, 83; 264/44, 86

[56] References Cited
U.S. PATENT DOCUMENTS 4,472,332  9/1984  Fukushima et al. ................... 501/1
4,504,218  3/1985  Mihara et al. .

FOREIGN PATENT DOCUMENTS 56-056514  5/1981  Japan .
62-142915  6/1987  Japan .

*Primary Examiner*—Mark L. Bell
*Assistant Examiner*—Paul Marcantoni
*Attorney, Agent, or Firm*—Sandler Greenblum & Bernstein

[57] ABSTRACT

Porous ceramic composition comprises 24-45 wt % of gairome, 25-45 wt % of chamotte, 2-10 wt % of low thermal expansivity component, 2-10 wt % of mineralizing agents, and 15-30 wt % of at least two kinds of organic components which provide porosity. The porous ceramic radiation plate is produced by sintering the composition, and the end result is a product that is high in quality and has an efficient thermal radiation transfer.

11 Claims, 3 Drawing Sheets

POROUS CERAMIC RADIATION PLATE

BACKGROUND OF THE INVENTION

The present invention relates to a porous ceramic radiation plate which comprises natural clay as its main component, and particularly to a ceramic composition which comprises at least two kind of organic compounds providing porosity to produce a porous ceramic radiation plate which has a low expansion coefficient and a high thermal radiation transfer coefficient.

Generally, a radiation plate is used in a gas-fired infrared burner (or Schwenk burner) for transferring thermal energy by radiation for baking foods such as biscuits or fish, drying ceramic products or coating metallic varnish, etc. In a gas-fired infrared burner, as shown in FIG. 1, liquified petroleum gas or natural gas is introduced through a gas jet (1) to the combustion channel (2) of the ceramic plate, then, the heat produced from the combustion of the gas is transferred to the pores in the radiation plate (3). Subsequently, the continuously formed triangular projection surface (4) of the plate emits infra-red radiation to heat a certain object such as food or workpiece.

In accordance with the gas-fired infrared burner, the efficiency of the radiation transfer is greatly affected by the porosity of the ceramic radiation plate. For the same porosity, as the radioactivity of small pores is more diffusive but less directional than large pores, the radiation plate which contains a larger number of smaller pores will result in more uniform transfer rate of radiation energy than that which contains larger pores. Moreover, if the same material is used, the radiation plate that has the most pores that are smaller in size will have a larger radiation area, so the efficiency of radiation transfer is increased, and the temperature of the surface of the plate is more uniform. As a result, the radiation plate will not easily crack and thereby have a longer useful life. Conversely, if most of the pores in plate are larger in size, the thermal stress in plate will be large and that will cause cracking on the surface of the plate. In addition, for radiation plates of same porosity, the total numbers of pores in the one containing fewer larger pores will result in greater heat transfer coefficient which will narrow the range of operating control conditions due to the higher possibility of a backfire occurring. As a result, a ceramic plate with small pores at high porosity is preferred to be used in an infra-red burner.

The common materials used in a conventional ceramic plate are metallic oxide or ceramic fibers. However, these materials are quite expensive. Furthermore, the addition of other components to the ceramic composition, such as sawdust, small foamed polystyrene ball, or graphite etc., may cause a problem of producing pores with a larger size. Therefore, there is a decrease in the efficiency of the heat transfer of radiation energy from the surface of the ceramic plate to the objects. On the other hand, it is observed that the time taken for sintering the ceramic composition is too long due to the assurance of product quality, and also preventing the cracking problem. Therefore, the conventional process is difficult to industrialize if both the production rate and the quality of the ceramic plate are required to be high. In conclusion, the efficiency of the radiation rate of the plate is greatly related to the porosity and to the size of the pores.

Conventionally, a porous ceramic composition comprises porous ceramic materials as its basic component, as well as some other additives such as inflammable compounds, foaming agent, or binding agent to form porosity. For example, a composition of porous ceramic material, such as diatomaceous earth etc., mixed with clay is sintered to produce a porous ceramic product. Another example, porous ceramic product can be obtained by sintering a composition of ceramic particles (e.g., chamotte, $SiO_2$, and $Al_2O_3$) which sizes are within a certain range, mixed with a suitable coal solvent.

For producing porous insulating or refractory material, usually, an organic component is added to the material, e.g., sawdust, graphite, coal powder, or small foamed polystyrene ball. However, it is known that several disadvantages are observed during the sintering process.

In accordance with the addition of sawdust to the porous refractory composition, the size of the sawdust is suggested to be less than 200 mesh. If the material contains some sawdust with a larger size, the product will easily crack, since the elasticity of the wood will cause a stress in the product. Furthermore, if sawdust is the only organic component mixed with the material to produce porosity, the volatile or inflammable component will be released at a certain narrow range of temperature during the sintering process, as a result, the quality of the product is low due to its cracking problem. Therefore, the sintering furnace should be turned off at 400°-500° C., and the sawdust should be slowly burnt off in the closed furnace. After all the sawdust has been burnt off, the furnace is turned on again and heated to sintering temperature to complete the sintering process. Therefore, the sintering time is too long whereby a production rate can not attained that is up to standards.

For the ceramic composition with added small foamed polystyrene balls, the distribution of the sizes of pores in the ceramic product is not homogeneous, i.e., it contains smaller pores as well as larger pores. Therefore, the efficiency of radiation transfer is greatly decreased. Also the time required for sintering the ceramic product is quite long due to the need for preventing cracking.

As the ignition point of graphite is too high that is can not easily be burnt off, the ceramic product doped with graphite will take a long time to complete its sintering process and much fuel is required to be used up that production cost is raised. For doping with coal powder, the quality of the ceramic product is low because of a cracking problem, since some coal powder may remain in the product.

According to the patents related to the process for making ceramic radiation plates, Japan Laid Open Patent No. 56-56514 discloses a ceramic composition which contains $Al_2O_3$, $SiO_2$, and SiC. For Japan Laid Open Patent No. 142915, $Al_2O_3$, $SiO_2$, MgO, $ZrO_2$, $TiO_2$, cordierite and mullite are used as the main components in a ceramic composition. U.S. Pat. No. 4,504,218 uses ceramic fiber $Al_2O_3$ and $SiO_2$ as the main components, while doping with $Li_2O$, the oxides of Ni, Co, Mn, Fe, Cr, V, and Ti, as well as fireclay. However, the material used in the above-mentioned patents are fine ceramic fiber or powder that causes the production cost to be high.

SUMMARY OF THE PRESENT INVENTION

It is an objective of the present invention to provide a porous ceramic radiation plate, especially a high quality radiation plate with homogeneous distribution of pore sizes while containing an abundance of small pores.

It is another objective of the present invention to provide a process for making a porous ceramic radiation plate where the sintering time required for the process is shortened and the production cost is low.

To attain the objectives of the present invention, natural clay is used as the elementary component of the ceramic composition, and at least two kinds of organic components with different combustion properties to provide porosity are doped to the composition. Also, some components with low thermal expansivity, mineralizing agent, and black calcined transition metallic oxide are added for further improving the efficiency of the heat radiation transfer.

DETAILED DESCRIPTION OF THE INVENTION

According to the ceramic composition of the present invention, it contains at least two kinds of organic components with different combustion and volatile properties. Since the organic components for providing porosity are burnt off in different temperature zone, i.e., the temperature range for the combustion of the organic components is large, or the rate of volatilization of the components is steady, it is not necessary to turn off the sintering furnace at a certain temperature. As a result, the time taken for the sintering process of the present invention is shortened and a high quality ceramic radiation plate without a cracking problem is produced. The organic components used in the examples of the present invention are carbon black and corn starch. It is known that these organic components while providing porous properties have a different temperature range of combustion (as shown in FIG. 2, the thermal analysis by NETZSCH Simultaneous Thermal Analyzer STA 409).

Natural clay, such as gairome and chamotte are used as the main components in the present composition, therefore, the production cost is low due to low price of natural clay. In addition, black calcined transition metallic oxide, e.g., $Fe_2O_3$, NiO, CuO, $Cr_2O_3$, and $MnO_2$, is doped to the composition for enhancing the efficiency of thermal radiation transfer. The ceramic radiation plate produced will be black in color.

Furthermore, some mineralizing agents like talc and feldspar, and low thermal expansivity components like cordierite and petalite are also added to the ceramic composition for obtaining a well-sintered ceramic radiation plate with high porosity and small size pores.

The ceramic composition of the present invention comprises 24–45 wt % of gairome, 25–45 wt % of chamotte, 2–10 wt % of low thermal expansivity component, 2–10 wt % of mineralizing agents, and 15–30 wt % of at least two kind of organic components which provides porosity. The composition is well mixed and formed into the desired shape, then sintered at 1000–1350° C. to produce a ceramic radiation plate. The preferred porosity of the plate is about 50–70%.

The objectives, features, and advantages of the present invention can be better understood from the following examples and drawings, wherein.

EXAMPLE 1

Figure 1:
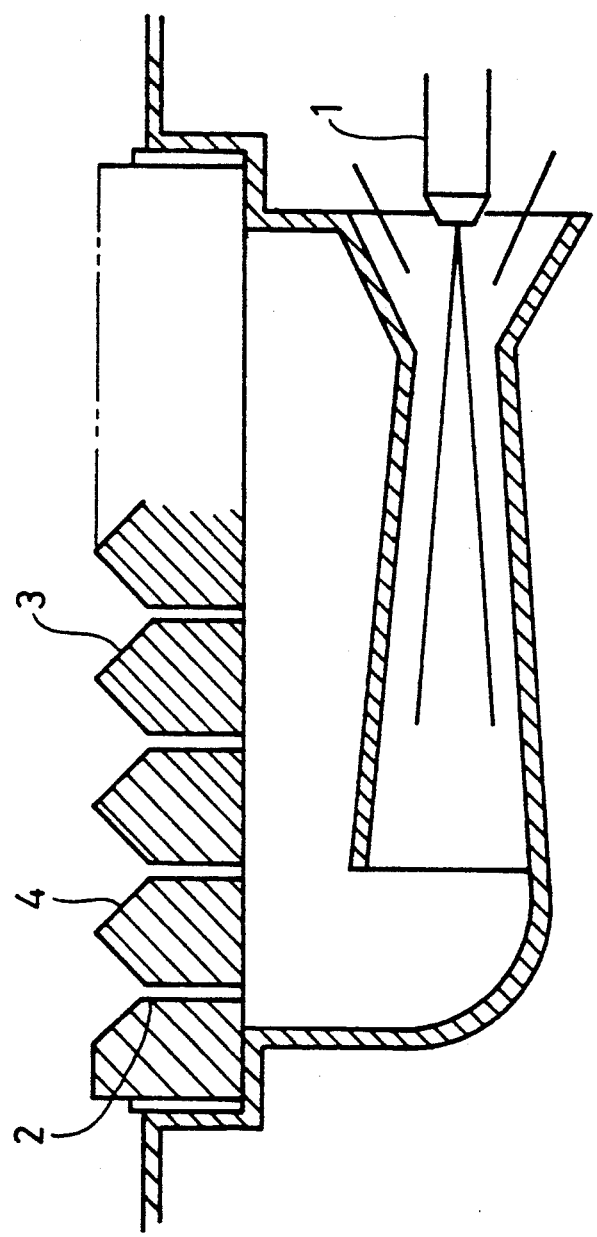
FIG. 1 is a cross-sectional view of the gas-fired infrared burner.
Figure 2:
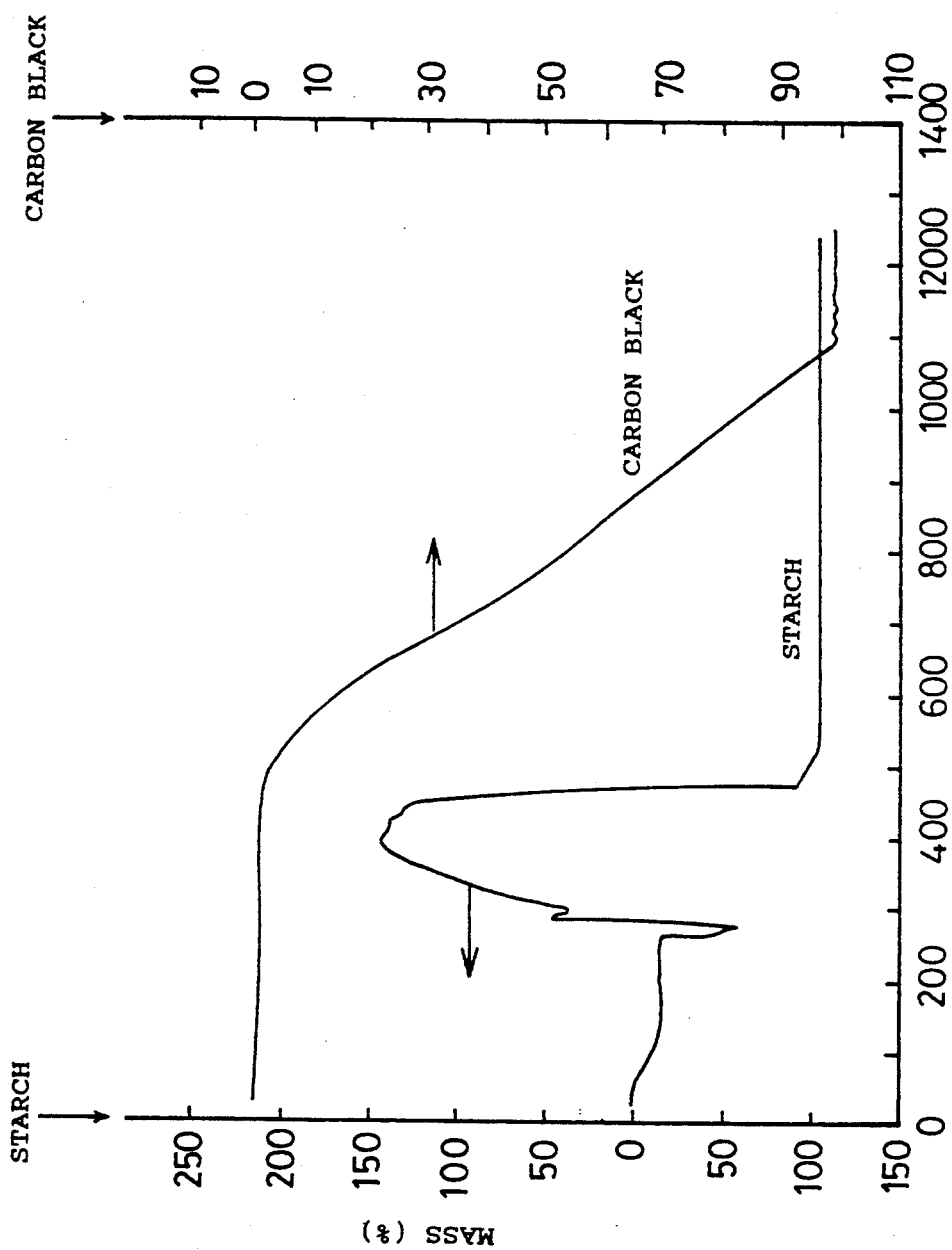
FIG. 2 is the thermal analysis of carbon black and corn starch.
Figure 3:
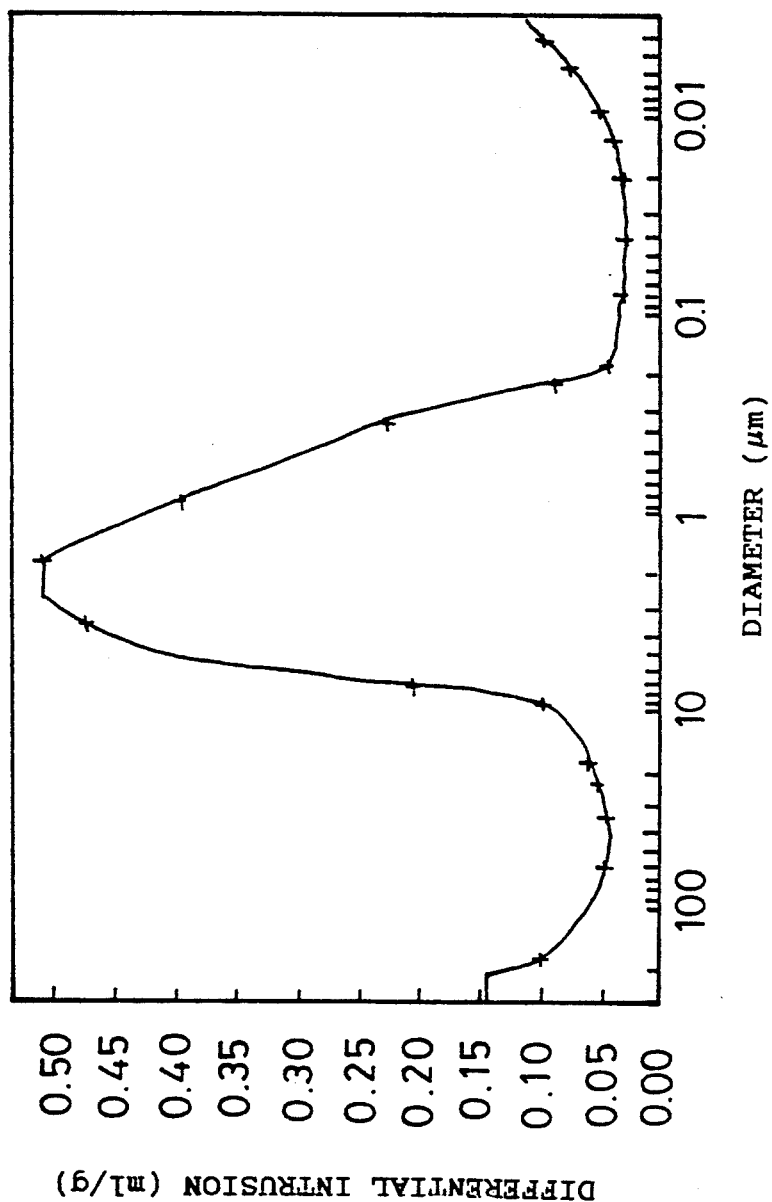
FIG. 3 is the distribution of the sizes of pros in the radiation plate of example 1.

In this example, the ceramic composition comprises 35 wt % of gairome, 35 wt % of chamotte, 3 wt % of petalite, 2 wt % of talc, 10 wt % of carbon black, and 15 wt % of corn starch. The composition is well mixed with a suitable amount of water, then formed into a plate shape. After drying and curing, the plate shape composition is sintered in a sintering furnace for 2 hours at 1150° C. A porous radiation plate thus obtained is 200 mm × 100 mm × 20 mm in size. As shown in FIG. 3, the distribution of the pore sizes is about within the range of 0.2–30 μm. In addition, the apparent porosity of the radiation plate is 60.64%, the fracture strength is 17.29 kgf/cm$^2$, and the thermal expansion coefficient is $5.67 \pm 0.2 \times 10^{-6}$.

EXAMPLE 2

The ceramic composition of this example by weight are 35% of gairome, 35% of chamotte, 3% of cordierite, 2% of talc, 10% of carbon black, and 15% of corn starch. The powdery composition is well mixed with a suitable amount of water, then formed into a plate shape. After drying and curing, the composition is subjected to a sintering process for 2 hours at 1150° C. A porous ceramic plate with average pore size of 3 μm, apparent porosity of 63.85%, fracture strength of 15.77 kgf/cm$^2$, and thermal expansion coefficient of $5.56 \pm 0.2 \times 10^{-6}$ is thus produced.

EXAMPLE 3

The ceramic composition of this example by weight are 30% of gairome, 30% of chamotte, 3% of cordierite, 2% of talc, 10% of a mixture of black calcined transition metallic oxides, 10% of carbon black, and 15% of corn starch. The powdery composition is well mixed with a suitable amount of water, then formed into a plate shape. After drying and curing, the composition is subjected to a sintering process for 2 hours at 1100° C. A porous ceramic plate black color is produced, and the plate has an apparent porosity of 64.34%, fracture strength of 10.24 kgf/cm$^2$, and thermal expansion coefficient of $4.86 \pm 0.2 \times 10^{-6}$.

What is claimed is:

1. A process for producing a porous ceramic radiation plate, comprising:
   (a) preparing a homogeneous ceramic composition comprising:
      25–45 weight percent of gairome;
      25–45 weight percent of chamotte;
      2–10 weight percent of low thermal expansivity component selected from the group consisting of cordierite and petalite;
      2–10 weight percent of mineralizing agent;
      0–10 weight percent of calcined transition metallic oxide; and
      15–30 weight percent of organic components selected from the group consisting of carbon black and corn starch; and
   (b) sintering the composition at 1000°–1350° C. for a time sufficient to produce a porous ceramic radiation plate.

2. The process according to claim 1, wherein said mineralizing agent is selected from the group consisting of talc and feldspar.

3. The process according to claim 1, wherein said calcined transition metallic oxide is selected from the group consisting of $Fe_2O_3$, $NiO$, $CuO$, $Cr_2O_3$, $MnO_2$, and mixtures thereof.

4. The process according to claim 2, wherein said calcined transition metallic oxide is selected from the group consisting of $Fe_2O_3$, $NiO$, $CuO$, $Cr_2O_3$, $MnO_2$, and mixtures thereof.

5. The process according to claim 1, wherein said time sufficient to produce a porous ceramic radiation plate comprises 2 hours.

6. The process according to claim 2, wherein said time sufficient to produce a porous ceramic radiation plate comprises 2 hours.

7. The process according to claim 4, wherein said time sufficient to produce a porous ceramic radiation plate comprises 2 hours.

8. The process according to claim 1, wherein the porous ceramic radiation plate has a porosity of about 50-70%.

9. The process according to claim 2, wherein the porous ceramic radiation plate has a porosity of about 50-70%.

10. The process according to claim 4, wherein the porous ceramic radiation plate has a porosity of about 50-70%.

11. The process according to claim 7, wherein the porous ceramic radiation plate has a porosity of about 50-70%.

* * * * *